(12) United States Patent
Aoyama et al.

(10) Patent No.: US 7,349,716 B2
(45) Date of Patent: Mar. 25, 2008

(54) MOBILE TERMINAL DEVICE, AND METHOD AND COMPUTER PROGRAM FOR INFORMATION PROCESSING THEREOF

(75) Inventors: Susumu Aoyama, Kawasaki (JP); Youiti Morimoto, Kawasaki (JP); Tadaaki Enomoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 133 days.

(21) Appl. No.: 10/651,034

(22) Filed: Aug. 29, 2003

(65) Prior Publication Data
US 2004/0110528 A1 Jun. 10, 2004

(30) Foreign Application Priority Data
Sep. 18, 2002 (JP) .............................. 2002-271386

(51) Int. Cl.
*H04Q 7/20* (2006.01)
(52) U.S. Cl. ................. 455/550.1; 455/566; 455/414.1
(58) Field of Classification Search ............. 455/550.1, 455/418, 556.2, 414.1
See application file for complete search history.

(56) References Cited

U.S. PATENT DOCUMENTS

| | | | | |
|---|---|---|---|---|
| 5,952,942 | A * | 9/1999 | Balakrishnan et al. | 341/20 |
| 6,094,586 | A * | 7/2000 | Nishiyama et al. | 455/566 |
| 6,442,251 | B1 * | 8/2002 | Maes et al. | 379/93.23 |
| 6,879,824 | B1 * | 4/2005 | Otsubo et al. | 455/414.1 |
| 2001/0049738 | A1 * | 12/2001 | Doi | 709/228 |
| 2003/0023792 | A1 * | 1/2003 | Schneider | 710/73 |
| 2003/0033312 | A1 * | 2/2003 | Koizumi et al. | 707/100 |
| 2003/0148753 | A1 * | 8/2003 | Pappalardo et al. | 455/405 |

FOREIGN PATENT DOCUMENTS

JP 08-237346 9/1996

* cited by examiner

*Primary Examiner*—Erika A. Gary
(74) *Attorney, Agent, or Firm*—Staas & Halsey LLP

(57) ABSTRACT

A mobile terminal device, an information processing method and an information processing program make it possible to select an optional function process during execution of a specific function process, such as a dictionary function process during a call, and executes simultaneously each function process or make that execution possible. Also, the device, the method and the program make it possible to copy information indicated in an optional screen of an indication part, and make it possible to indicate that information in a screen of a different function process. That is, the mobile terminal device has a communication processing part, a function processing part, a selection input part (an input operation part) and a control part. The communication processing part executes each communication process of voice communication, such as telephonic voice communication, and non-voice communication, such as non-voice data communication. The function processing part executes a function process selected from one or more function processes except the communication processes. The selection input part selects a function process to execute from one or more function processes which have been prepared or are prepared in the function processing part, by means of an operational input. The control part executes one or more function processes selected from one or more function processes including the communication processes, or controls to make that execution possible.

20 Claims, 11 Drawing Sheets

MOBILE TERMINAL DEVICE, AND METHOD AND COMPUTER PROGRAM FOR INFORMATION PROCESSING THEREOF

BACKGROUND OF THE INVENTION

1. Field of the Invention

The present invention relates to a mobile terminal device, such as a mobile phone, PDA (Personal Digital Assistants), PHS (Personal Handyphone System) and a note type personal computer/notebook personal computer, and a method and a computer program for information processing of the mobile terminal device. In particular, it relates to a mobile terminal device, and a method and a computer program for information processing thereof, which can selectively execute each communication process of voice communication or non-voice communication and each function process except the communication processes, or which can simultaneously execute each process.

2. Description of the Related Art

A mobile terminal device, such as a mobile phone, can perform mobile communication and mobile computing, and constructs a communication information station which can make use of information and can transmit an intention by way of utilization of a network on the way to the place where a person is going or at the place where a person has gone.

The present invention relates to a mobile terminal device which can perform each communication process of the voice communication or the non-voice communication and various function processes, such as a mail function and a dictionary function, and relates to the mobile terminal device and its processing technology which make it possible to simultaneously execute a function process while the communication process, such as a telephone call, or another function process is being executed.

By the way, a conventional mobile terminal device has various functions of a mail function, a dictionary function, and so on. As a dictionary function, for example, there is an English-Japanese dictionary function. This dictionary function is utilized for retrieval of a necessary vocabulary and the meaning of a necessary ward.

Further, there is a notebook function as an additional function on a mobile terminal device. As an earlier technology in which the notebook function and a telephone function are unified, the Japanese Patent Laid Open Publication No. 8-237346 is in existence, for example.

In the Japanese Patent Laid Open Publication No. 8-237346, an electronic system notebook and a mobile phone are unified, and both functions of the system notebook and the radio telephone are made to operate. By this, the simplification of an operation for the phone number retrieval and the dial calling of the telephone is intended to be realized.

By the way, in the English-Japanese dictionary function of the conventional mobile terminal device, since only calling of vocabulary on the dictionary function of single operation is possible, it is difficult to look up an obscure word while talking over the telephone namely during a call. Because of this, after hanging up the receiver, it is necessary to start up the English-Japanese dictionary function. That is, the telephonic communication is interrupted, the dictionary function is started up, and then a desired word is retrieved. Operation like this is troublesome in the extreme and is inefficient.

Further, in the conventional mobile terminal device, in order to record a result obtained by the dictionary function or transmit the result to other party correctly, there is no way but to make a note of that result. Because of this, it is troublesome in the extreme.

Furthermore, the portable telephone equipment of electric system notebook type disclosed in the above-mentioned Japanese Patent Laid Open Publication No. 8-237346 has made it possible to perform processing in which stored contents of the notebook are read out during a call, the telephonic communication is kept while a user is referring to those contents, and contents of the telephonic communication are written in a memorandum function. However, in this portable telephone equipment of electric system notebook type, an independent portable telephone equipment and an independent electric system notebook are only combined so as to be able to open and close. Therefore, dial keys of the portable telephone equipment side and function keys of the electric system notebook side are provided separately, for example. That is, the communication process of the portable telephone equipment and the function process are constructed independently. Because of this, as for a mobile terminal device, the size of a device becomes larger and the easiness of an operation is low.

SUMMARY OF THE INVENTION

The present invention relates to a mobile terminal device able to perform a lot of function processes in addition to communication. An object of the present invention, therefore, is to make it possible to select an optional function process in executing a communication process or a function process, for example, a dictionary function process during a call, and is to execute each function process simultaneously or is to make that execution possible.

Another object of the present invention is to make it possible to copy information indicated on an optional screen of an indication part and indicate that information on a screen of a different function process.

In order to attain the objects mentioned above, a mobile terminal device of the present invention provides a communication processing part (2), a function processing part (4), a selection input part (an input operation part 6) and a control part (8). The communication processing part executes each communication process of voice communication, such as telephonic voice communication, and non-voice communication, such as non-voice data communication. The function processing part executes a function process selected from one or more function processes except the communication processes. The selection input part selects a function process to execute from one or more function processes which have been prepared or are prepared in the function processing part, by means of an operational input.

Further, the control part executes one or more function processes selected from one or more function processes including the communication processes, or controls to make that execution possible. This control includes;

(1) a process that receives a selective input added by an operation from the above-mentioned selection input part while the above-mentioned communication process or the above-mentioned function process is being executed, (2) a process that selects a function process instructed by the selective input, and (3) a process that executes the selected function process simultaneously with the above-mentioned communication process or the above-mentioned function process under execution.

In addition, the process of the control (3) includes a process that makes it possible to execute the selected function process simultaneously with the communication process or the function process under execution. And, although the control in the control part includes not less than two function processes, this is not intended to exclude the execution of only a single function process.

According to the construction mentioned above, in addition to the execution of only a communication process, when a communication process or a function process except a communication process is being executed, an optional function process and/or communication process is selected based on the selective input from the selection input part, and it is possible to execute two or more function processes. For example, when a communication function process and/or a different function process is being executed, a user can start up a game function or a mail function which is one of the function processes, and can perform a game or the making of a mail. In the making of a mail, a user can make the contents of a telephonic communication a mail, and thereby quick transmission will be possible. Therefore, according to this mobile terminal device, when a communication process or a function process is being executed, the selection input part receives the selection of a different function process, and the different function process can be executed. Because of this, it is possible to realize a plurality of function processes by means of a simple operation.

Further, in order to attain the above objects, in the mobile terminal device according to the present invention, the above-mentioned function process executed by the function processing part can include a dictionary function process able to select an optional vocabulary or word from a dictionary. According to a construction like this, when a communication process, such as a telephonic conversation, is being executed, it is possible to start up a dictionary function, which is one of the function processes, and perform the retrieval of a vocabulary. Since a user can perform the confirmation of a character (a word, etc.), a vocabulary and the meaning of a word during a call, it is possible to make the retrieved contents reflect in a telephonic communication by referring to the retrieved contents.

Therefore, in this mobile terminal device, the function processes executed by the function processing part can include the dictionary function process able to select an optional vocabulary or word from the dictionary. By this, when a function process is being executed, a user can call up the dictionary function, retrieve a vocabulary and/or its meaning and use the result of this retrieval in the function process under execution.

In addition, in order to attain the above objects, in the mobile terminal device according to the present invention, the above-mentioned control part can provide a processing function which, based on a copy processing input, performs a copy indication (a cursor indication 130) indicating a copy process at the whole or a part of information under display on an indication part (10) and makes the copy-indicated information maintain in a storage part (a memory 34). That is, the contents of the processing function in the control part are;

(1) to receive the copy processing input while information is being displayed in the indication part, (2) to perform the copy indication indicating the copy process at the whole or a part of the information under display on the indication part, and (3) to make the copy-indicated information maintain in the storage part.

In the processing function (1), the indication part is not limited to an image display as hardware like a liquid crystal display. The indication part may also be an indicator which gives a voice output like a speaker, and may also be an indication program which is software indicating information in an indicator like this. At this, the information, in addition to character information and graphics information, is all of information which can be indicated in the indication device, and also includes voice information.

In addition, in the processing function (2), the information under display is information which is being output. The whole or a part of the information includes the whole or apart of elements, such as pixels, constituting the information in addition to the whole or a part of information which is optionally selected. Further, the copy process is a process which stores the information so as to be able to reproduce it without doing damage to the indicated information of the whole or a part of that information. Furthermore, the copy indication of that is a process which gives indication representative of a portion to perform the copy process to the whole or a part of the information. In this process, for example, a portion to copy is divided, and luminosity of the divided portion is reversed, namely what is called reversing display is performed.

Further, in the processing function (3), to make the copy-indicated information maintain in the storage part is to temporally store the information selected by the copy indication in the storage part so that the information can be reproduced. The storage part which stores the information, for example, can be constructed by a storage part able to record and erase, which is set separate from a storage part storing a dictionary.

Therefore, in this mobile terminal device, the control part can provide a processing function that, based on the copy processing input, performs the copy indication indicating the copy process at the whole or a part of information under indication in the indication part and makes the copy-indicated information maintain in the storage part. By this, since the whole or a part of the indicated information is stored in the storage part by means of the copy process, it is possible to reproduce and use that information in a function process. Because of this, along with the simplification of a processing operation, the replenishment of information processing can be given.

Further, in order to attain the objects mentioned above, the mobile terminal device can also provide an indication part that indicates information given by the function process under execution and management in the control part. Also, the mobile terminal device can include a storage part that memorizes information given by the function process under execution and management in the control part or information used in the function process.

Further, in order to attain the objects mentioned above, the mobile terminal device according to the present invention can also provide an indication part that indicates information, an instructions input part that is used for instructions to fix contents indicated in the indication part or is used for cancellation of that fixation, and a control part that fixes the contents indicated in the indication part or cancels that fixation in response to input representative of the instructions to fix or the cancellation of that fixation from the instructions input part.

In order to attain the objects mentioned above, an information processing method of the mobile terminal device of the present invention includes each step that performs a communication process, a function process, a selection process of a function process and a control process. That is, in the communication process, each communication process of the voice communication or the non-voice communication is executed, and, in the function process, function processes except the communication processes are executed. Further, in the selection process of a function process, first, a function process which should be managed is selected. Then, when the communication process or the above-mentioned function process is being executed, the selected function process is executed simultaneously with the above-mentioned communication process or the above-mentioned function process under execution, or that execution is controlled to become possible. And, either of the steps representative of a communication process and a function process may also precede. It is enough if the information processing method includes the steps of a communication process and a function process. That is, the order of these steps does not prescribe these time relation.

According to the information processing method mentioned above, in addition to the execution of only a communication process, when a communication process or a function process except the communication processes is being executed, an optional function process and/or an optional communication process is selected based on a selective input, and it is possible to execute two or more function processes. For example, in executing a communication function process and/or a different function process, a game function and/or a mail function which is one of the function processes is stated up, and a game and/or the making of a mail can be performed.

Therefore, according to the information processing method of the mobile terminal device, it is possible to optionally execute each communication process of the voice communication or the non-voice communication and a function process except the communication process. Along with this, when each communication process or the function process is being executed, it is possible to simply execute a selected different function process. Because of this, the diversity of communication and information processing can be realized.

In order to attain the objects mentioned above, the information processing method of the mobile terminal device of the present invention can provide a construction that the function process except the communication process is a dictionary function process, and/or a construction that the function process except the communication process is a mail function process, and/or a construction that the function process except the communication process is a dial registration process. Further, the method can provide a construction that the dictionary function process includes a copy process of information displayed on an output screen.

Further, in order to attain the objects mentioned above, the information processing method of the mobile terminal device of the present invention may also provide a construction comprising a step that indicates information in an indication part, a step that receives instructions to fix contents indicated in the indication part or cancellation of that fixation, and a step that fixes the contents indicated in the indication part or cancels that fixation by means of the instructions to fix or instructions of the cancellation thereof.

In order to attain the objects mentioned above, an information processing program of the mobile terminal device of the present invention includes a function that executes each communication process of the voice communication or the non-voice communication, a function that executes a function process except the above-mentioned communication processes, a function that selects a function process to manage, and a function that, when the above-mentioned communication process or the above-mentioned function process is being executed, executes or enables to execute the selected function process simultaneously with the above-mentioned communication process or the above-mentioned function process under execution. That is, according to this information processing program, the information processing method of the mobile terminal device according to the present invention can be executed.

In order to attain the objects mentioned above, the information processing program of the mobile terminal device of the present invention can provide a construction that the function process except the communication process is a dictionary function process, and/or a construction that the function process except the communication process is a mail function process, and/or a construction that the function process except the communication process is a dial registration process. Further, the program can provide a construction including a step that executes a copy process of information displayed on an output screen, in the dictionary function process.

In order to attain the objects mentioned above, the information processing program of the mobile terminal device of the present invention may also provide a construction comprising a step that indicates information in an indication part, a step that receives instructions to fix contents indicated in the indication part or cancellation of that fixation, and a step that fixes the contents indicated in the indication part or cancels that fixation by means of the instructions to fix or instructions of the cancellation thereof.

BRIEF DESCRIPTION OF THE DRAWINGS

The foregoing and other objects, features and attendant advantages of the present invention will be appreciated as the same become better understood by means of the following description and accompanying drawings wherein.

DETAILED DESCRIPTION OF THE PREFERRED EMBODIMENTS

Figure 1:
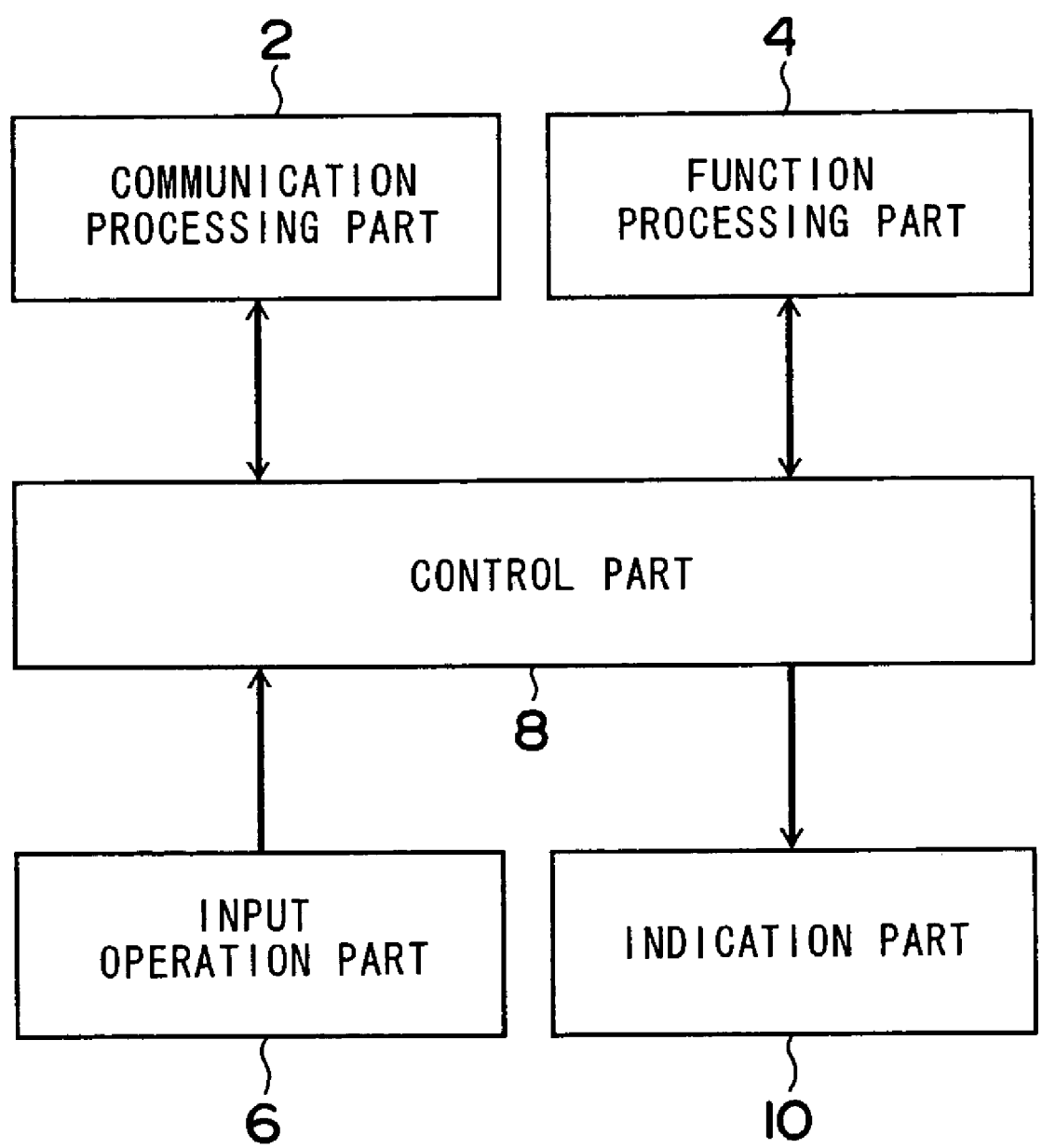
FIG. 1 is a block diagram showing an outline of a mobile terminal device representative of an embodiment of the mobile terminal device and an information processing method thereof according to the present invention.

FIG. 1 shows an outline of a mobile terminal device and an information processing method of the mobile terminal device representative of an embodiment according to the present invention. This mobile terminal device is a communication and information processing apparatus, such as a mobile phone, PDA, PHS and a note type personal computer/notebook personal computer, and, in addition to an ordinary telephone service, has a construction and function that make it possible to perform the internet communication by means of a server system connecting between a PDC mobile packet transmission system {PDC-P (Personal Digital Cellular-Packet)} network and the internet. Therefore, in the mobile terminal device, a communication processing part 2, a function processing part 4, an input operation part 6, a control part 8, an indication part 10, and so on are provided. The input operation part 6, in respect to each function process of the communication processing part 2 and the function processing part 4, constructs a selection input part which selects one or more function processes from a plurality of function processes. The control part 8 controls the input operation part 6, the communication processing part 2 or the function processing part 4, or executes one or more function processes according to a selective input of the input operation part 6, or performs control so as to make it possible to execute one or more function processes. In this embodiment, the control part 8 is used for controlling the communication processing part 2 and the function processing part 4. However, this is not intended to limit to this construction. Each of the processing parts 2 and 4 provides a control part independent of the control part 8, respectively, and each control part may also be connected. Further, the indication part 10 indicates information and the contents of a process under execution.

For information processing executed by an information processing program which is stored in the control part 8, the following processes are included.

A step I: a process that executes each communication process of voice communication or non-voice communication.

A step II: a process that executes a function process except the communication processes.

A step III: a process that receives the selective input selecting a function process to manage.

A step IV: a process that receives the selective input given from the input operation part 6 by means of an operation while the communication process or the function process is being executed, and executes a function process selected by the selective input simultaneously with the communication process or the function process under execution, or makes that execution possible.

Therefore, according to the construction or processing mentioned above, in the communication processing part 2 the communication process of the voice communication or the non-voice communication is executed, and in the function processing part 4 a function process except the communication processes is executed. In this case, a function process managed by the function processing part 4 is optionally selected by a user operating the selection input part namely the input operation part 6. Then, in the control part 8, the selective input given by the operation of the input operation part 6 is received while the communication process or the function process is being executed, and the control in which the function process selected based on the selective input is executed simultaneously with the communication process or the function process under execution is performed, or the control to make that execution possible is realized.

Further, the control part 8 may also provide the following processing function. In this processing function, a copy indication which indicates a copy process is performed at the whole or a part of information under display on the indication part 10, based on a copy processing input from the input operation part 6, and the whole or apart of the information indicated by the copy indication is maintained in the control part 8 or a storage part provided outside the control part 8. According to the construction mentioned above, the copy indication is performed at information, such as characters and figures, indicated in the indication part 10, the information indicated by the copy indication is maintained in the storage part, and thereby that information can be indicated in the indication part on the same function process or a different function process.

Figure 2:
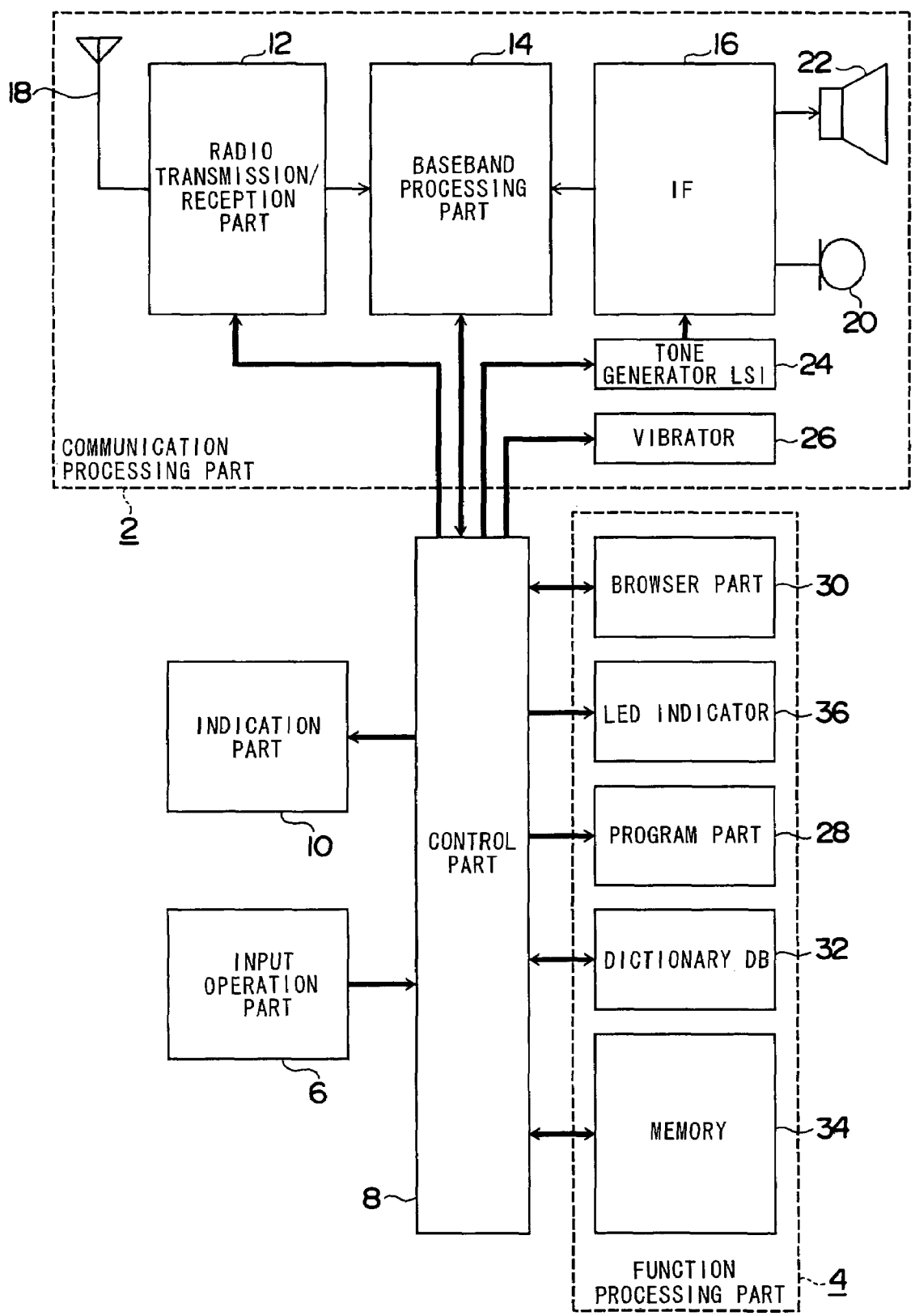
FIG. 2 is a block diagram showing the mobile terminal device according to the embodiment.

A mobile terminal device used in these mobile terminal devices and the information processing method thereof can be constructed as shown in FIG. 2, for example.

In FIG. 2, the communication processing part 2 executes the communication process, such as voice communication of telephonic voice communication, etc., and non-voice data communication as non-voice communication except the voice communication. The communication processing part 2 provides a radio transmission/reception part 12, a baseband processing part 14, an interface (IF) 16, an antenna 18, an microphone 20, a speaker 22, a tone generator LSI 24, a vibrator 26, and so on.

The radio transmission/reception part 12 performs transmission and reception of a high-frequency signal through the antenna 18. The radio transmission/reception part 12 at its transmission side has a modulation circuit which modulates a carrier signal with a voice signal or a data signal and generates a baseband modulation signal and so on which should be transmitted, a power amplifier which amplifies an output signal of the modulation circuit, and so on. The radio transmission/reception part 12 at its reception side has a high-frequency amplification part which amplifies directly the high-frequency signal received with the antenna 18, a demodulation circuit which demodulates a received signal of the voice signal or the data signal from the high-frequency signal, and so on.

The baseband processing part 14 performs encoding for error correction of a transmitting signal and a received signal, an interleaving process, formation and resolution of a frame, and so on. For example, in the TDMA (Time Division Multiple Access) system which transmits and receives a data by way of time-division multiplexing, a TDMA control circuit is provided, or, in the CDMA (Code Division Multiple Access) system, a CDMA control circuit and so on are provided.

In the IF 16, a voice amplifier and so on are provided. The IF 16 amplifies a voice signal input from the microphone 20, or amplifies a voice signal reproduced by the baseband processing part 14 and a voice signal from the tone generator LSI 24 and outputs from the speaker 22. The tone generator LSI 24 is a tone source of a bell sound or a melody representative of the reception of a call. Further, the vibrator 26, when receiving a call, informs this reception by means of vibration. In addition, in this embodiment, the control part 8 is used for control of the radio transmission/reception part 12, the baseband processing part 14, the IF 16, the tone generator LSI 24 and the vibrator 26 of the communication processing part 2.

Further, the function processing part 4 constructs a department which executes various functions, such as a dictionary function and a mail function, as function processes except the communication processes in the communication processing part 2. The function processing part 4 has a program part 28 as a first storage part, a browser part 30, a dictionary DB (Data Base) 32, a memory 34 as a second storage part, an LED indicator 36, and soon. Execution of the function processes in the function processing part 4 is performed by using the control part 8. In this embodiment, the input operation part 6 which is used for inputting the selection of a function process, and so on, is provided. Further, the indication part 10 as a first indication part and the LED indicator 36 as a second indication part are provided.

For the program part 28, a ROM (Read Only Memory) is used. In the program part 28, a heap of software including the information processing program and various function processing programs according to the present invention are stored. Further, in the browser part 30 browser software is stored, and a user can read HTML (Hyper Text Markup Language) text and GIF (Graphic Interchange Format) of the internet world standard by this browser software. Furthermore, the dictionary DB 32 is constructed by using a ROM, and stores one or more dictionaries of the same language or a different language, for example, an English-Japanese dictionary, a Japanese dictionary, a dictionary of Chinese characters explained in Japanese, an English dictionary, a Korean-Japanese dictionary, a Japanese-Korean dictionary, an English-Korean dictionary and a Korean-English dictionary. The dictionary DB 32 also stores a program for a copy function process of a vocabulary, and so on. The program for the copy function process may also be stored in the program part 28. Further, the LED indicator 36 is used for indicating the charging and/or the charged condition of an inside battery not shown in the drawings, for example.

In addition, the input operation part 6 in this embodiment is constructed by numeric keys and function keys for inputting a telephone number and character information, a slide switch, and so on. Each key is constructed by a touch switch. Further, the indication part 10 operates by impressing a power source, and, as the contents of display thereof, displays a standby display at the time of the completion of a communication process and a function process, information in the middle of processing, etc., on its screen. The indication part 10 also indicates information in the middle of processing, etc., on its screen. The indication part 10 can perform the display of characters of M lines-by-N rows (M≦N or M≧N), and so on. For example, in the case that upper and lower two lines are used for the indication of functions, it is possible to display, for example, 8 characters-by-8 lines (=64 characters) by using a full-sized character or 16 characters-by-8 lines (=128 characters) by using a half-sized character on a character display area able to use.

Figure 3:
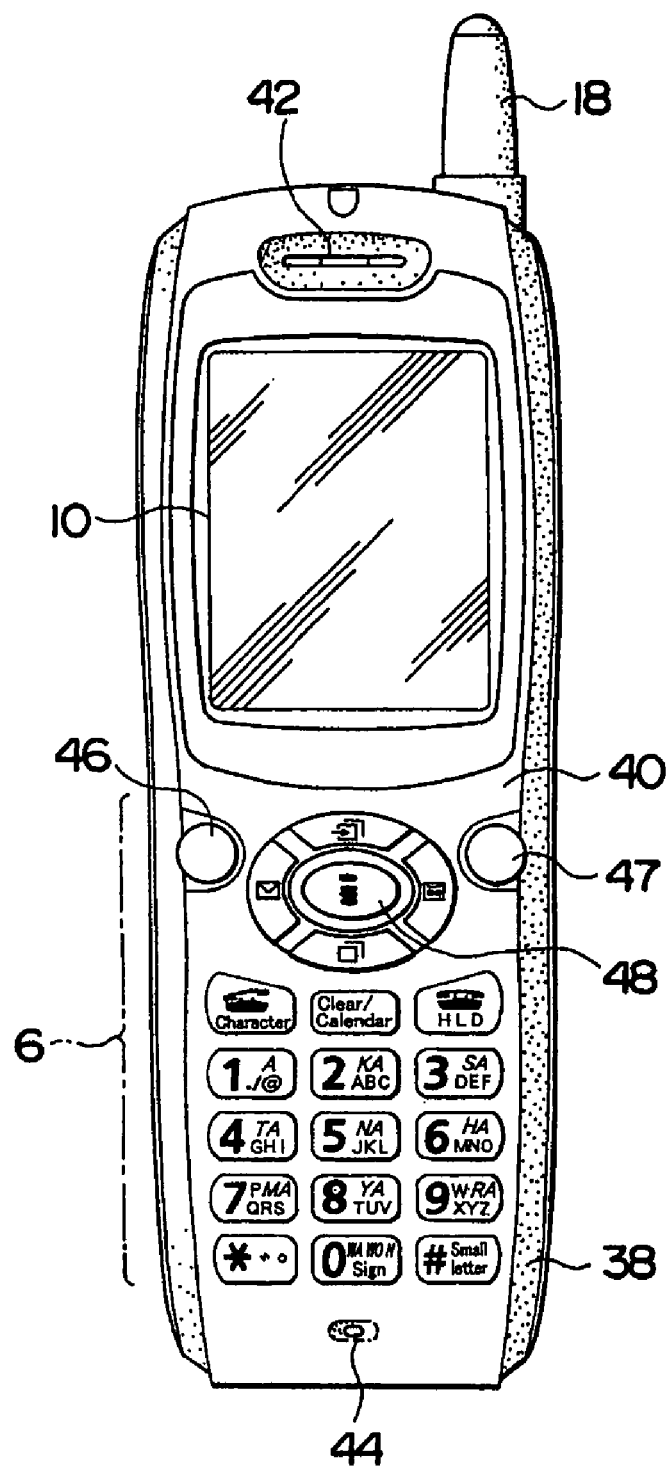
FIG. 3 is a front view showing an example of the mobile terminal device of FIG. 2.

Furthermore, for this mobile terminal device, for example, a housing 38 shown in FIG. 3 is used. At an upper side of the housing 38, the antenna 18 which can expand and contract is attached. At a panel part 40 provided at its front side, a voice output opening 42 corresponding to the speaker 22, the indication part 10, the input operation part 6 and a voice input opening 44 corresponding to the microphone 20 are provided in the direction of a lower side of the panel part 40 from an upper side of the panel part 40.

Figure 4:
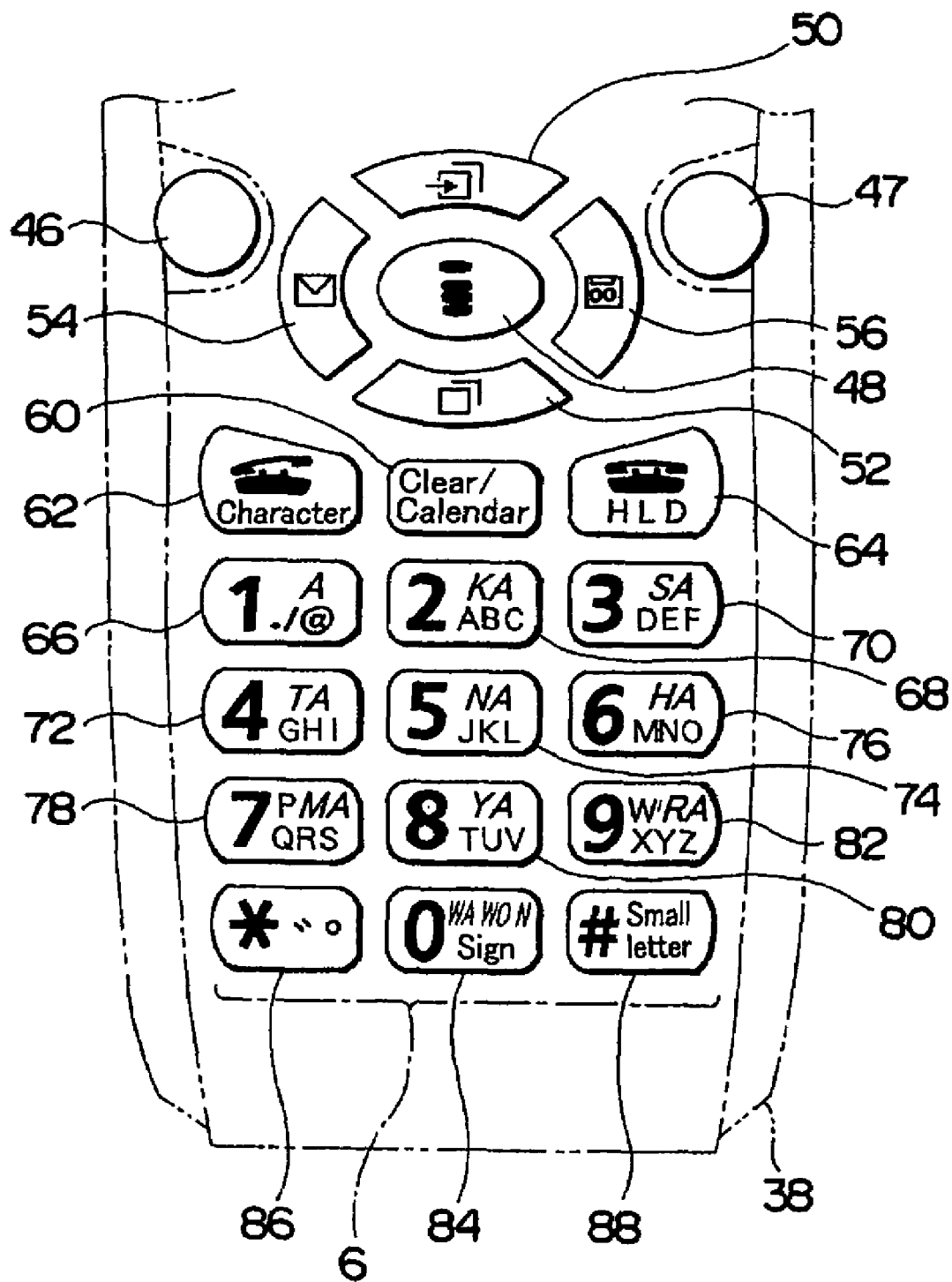
FIG. 4 is a drawing showing an input operation part of the mobile terminal device of FIG. 3.

In the input operation part 6, as shown in FIG. 4 as an example, a menu/submenu key 46 is arranged at its left upper portion, and a soft key 47 is arranged at its right upper portion. A circular decision key 48 is provided between the menu key 46 and the soft key 47, and an up cursor key 50, a down cursor key 52, a left cursor key 54 and a right cursor key 56 are arranged around the decision key 48. In a lower side of the down cursor key 52, a start key 62 is provided at the left side of a clear key 60 as the middle, an end key 64 is provided at the right side of the clear key 60, and twelve character input keys 66, 68, 70, 72, 74, 76,78, 80, 82, 84, 86 and 88 arranged in a 3-by-4 array, on which a figure, a character or a sign is written, are provided.

Figure 5:
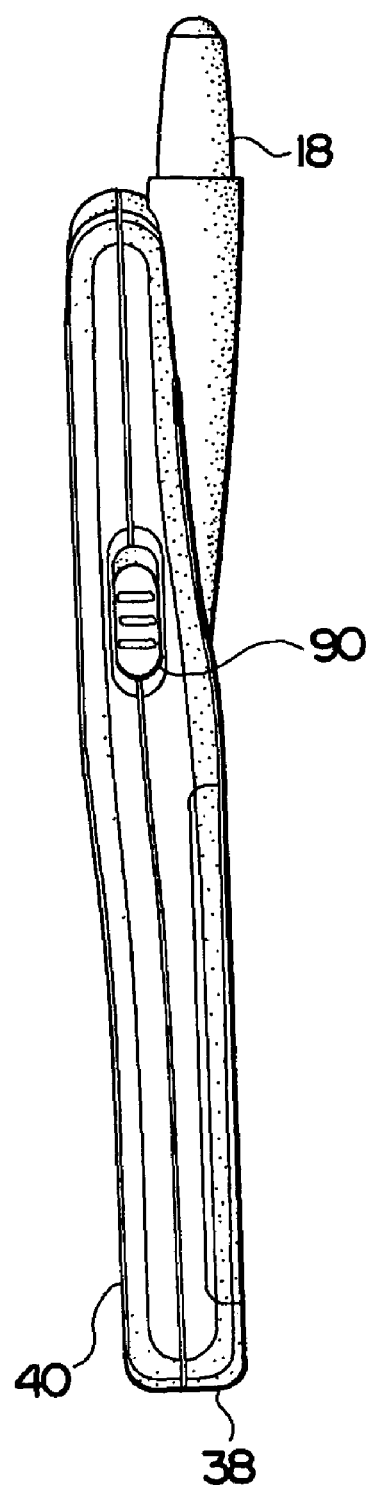
FIG. 5 is a side view showing the mobile terminal device of FIG. 3.

Further, in a side portion of the housing 38, as shown in FIG. 5 as an example, a locking switch 90 constructed by a slide switch is provided as a different instructions input part. The locking switch 90, for example, is used for the fixation of display of information, such as display of a vocabulary under processing, and the cancellation of that fixation, the voidness and return of key-in, and so on.

Figure 6:
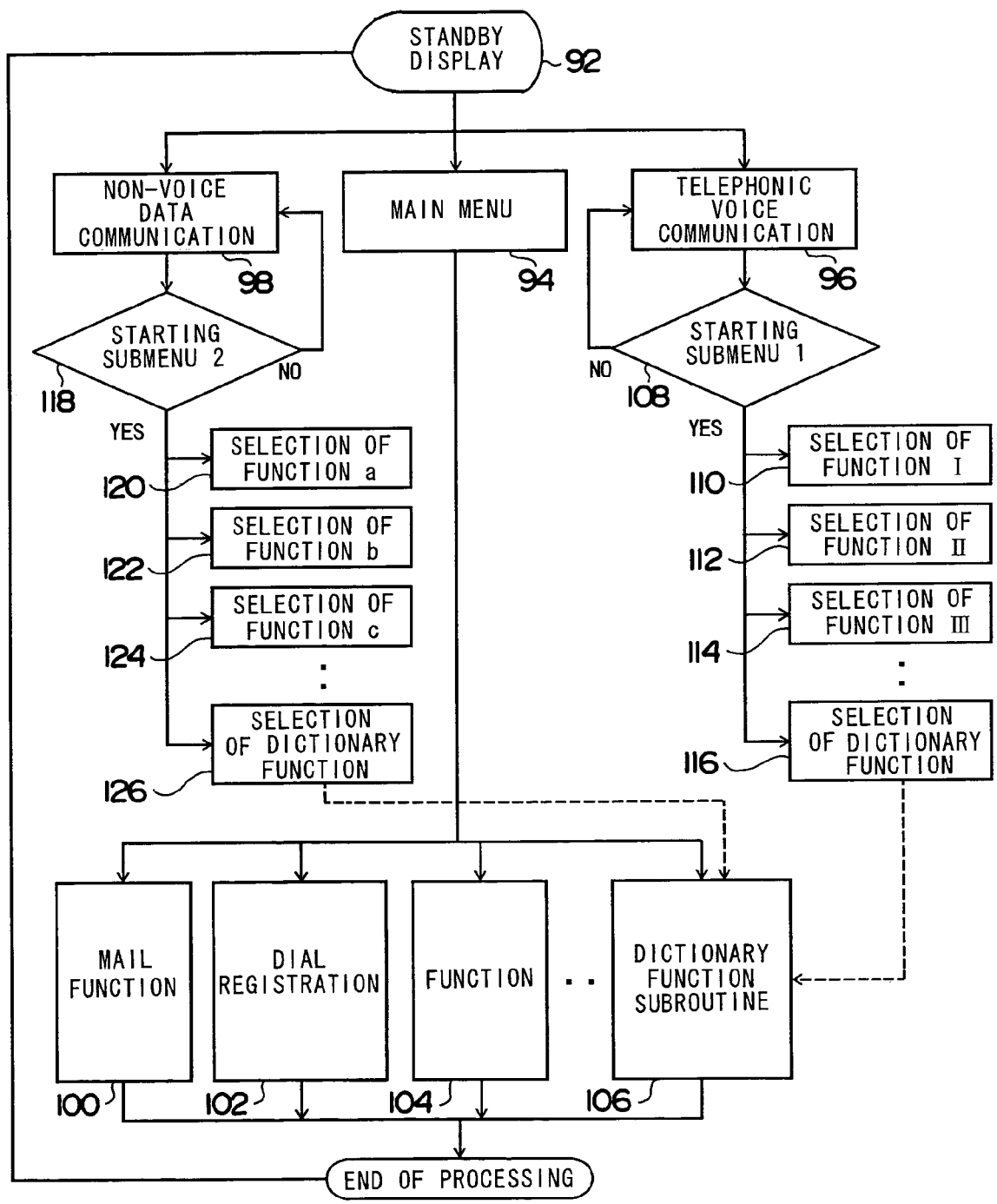
FIG. 6 is a drawing showing the contents of processing in the information processing method and an information processing program according to the embodiment.

In processes executed by the mobile terminal device and the information processing method thereof according to this embodiment, as shown in FIG. 6 as an example, it is possible to perform a standby display process 92, a main menu process 94, a telephonic voice communication process 96 as a voice communication process and a non-voice data communication process 98 as anon-voice communication process. In this case, the standby display process 92 is executed by a power source being impressed. When a standby display is started up by the standby display process 92, the main menu process 94 is executed by an operation of the menu key 46. Further, the telephonic voice communication process 96 is executed if the start key 62 is operated after entering a phone number by means of the character input keys 66-84 when making a call, or if the start key 62 is operated when receiving a call. Furthermore, the non-voice data communication process 98 is executed by an operation of the decision key 48, and so on.

In the main menu process 94, it is possible to selectively perform processing, such as a mail function process 100, a dial registration process 102, another function process 104 and a dictionary function subroutine 106. The function process 104, for example, is a redial registration process. Further, in the telephonic voice communication process 96, if a submenu process 108 is started up by the operation of the input operation part 6, selection of the dictionary function 116 is executed, besides a heap of selection of a function 110, 112 and 114. In addition, in the non-voice data communication process 98, if a submenu process 118 is started up, selection of the dictionary function 126 is executed, besides a heap of selection of a function 120, 122 and 124.

Figure 7:
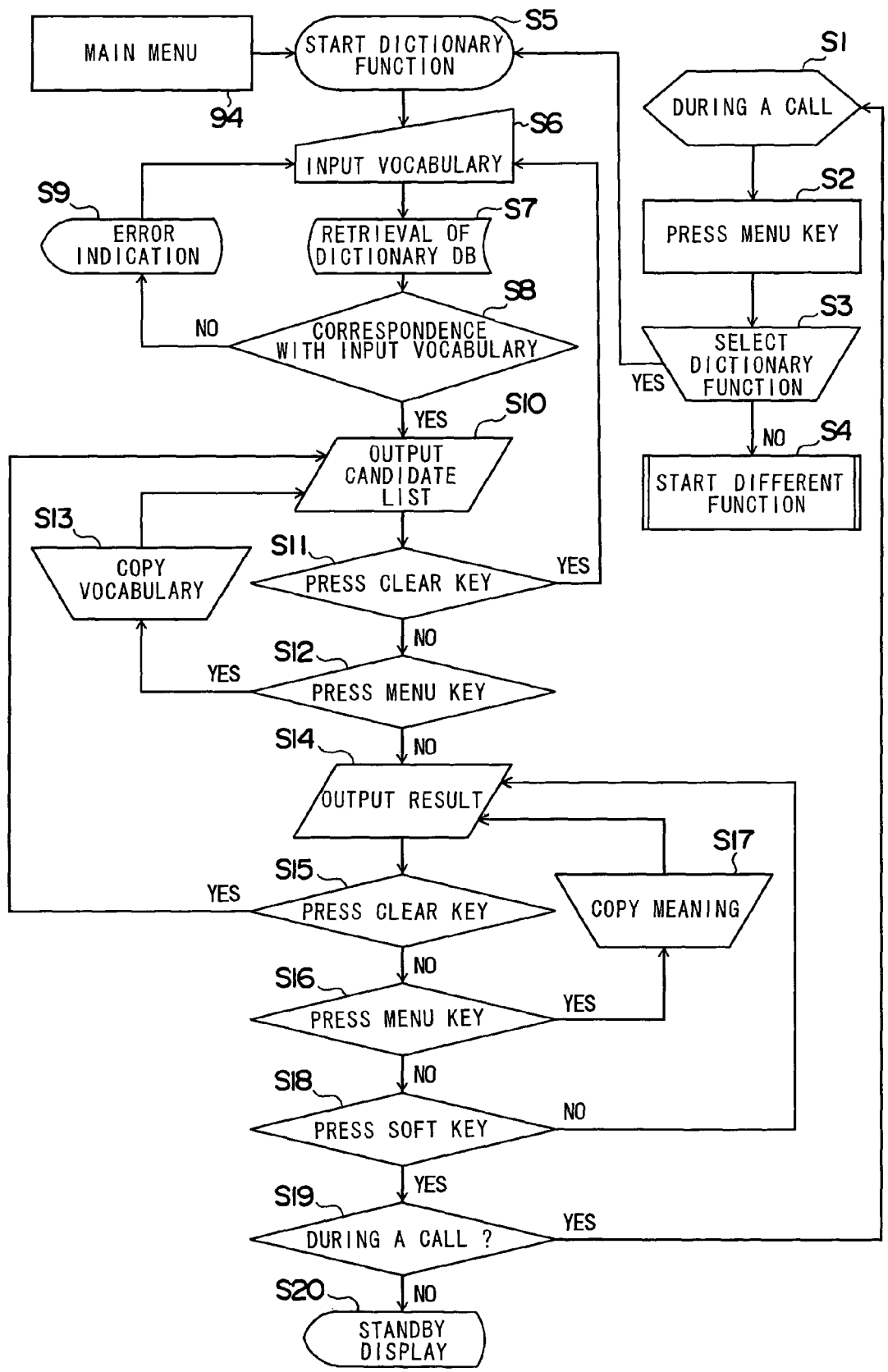
FIG. 7 is a flow diagram showing a dictionary function process and so on during telephonic communication.

Furthermore, in this mobile terminal device, when the communication function process and/or another function process is being executed, a different function process can be executed based on the selective input of a function process. For example, in a flow diagram shown in FIG. 7, the dictionary function process is realized as a different function process during the communication process. In this embodiment, the English-Japanese dictionary function is given as an example.

A step S1 shows a state under a call. This state under a call is representative of a state that the telephonic voice communication process 96 shown in FIG. 6 is being executed. In this state under a call, if the menu key 46 is pressed (a step S2), the device jumps to the submenu process 108 and can perform a process for the selection of the dictionary function 116. In this case, since a heap of the functional selection 110-114, the selection of the dictionary function 116 and so on are displayed on the indication part 10, the selection of the dictionary function 116 is selected from that display by operating the up cursor key 50 or the down cursor key 52. After that, if the decision key 48 is pressed, the selection of the dictionary function of a step S3 is terminated. At this, if the decision key 48 is pressed after a different function is selected by the operation of the up cursor key 50 or the down cursor key 52, the different function process of a step S4 is to be started up.

If the dictionary function is selected, the device proceeds to a step S5, and the dictionary function subroutine 106 in the processing of the main menu process 94 is started up. The starting of this dictionary function subroutine 106, for example, selects "setting" and "convenient functions" from a menu displayed by the operation of the menu key 46, selects "an English-Japanese dictionary" as an example, and calls out the dictionary function. Although in this embodiment the dictionary function subroutine 106 is stated up from the state under the telephonic communication, it is also possible to start up the dictionary function subroutine 106 from the main menu process 94.

Figure 8:
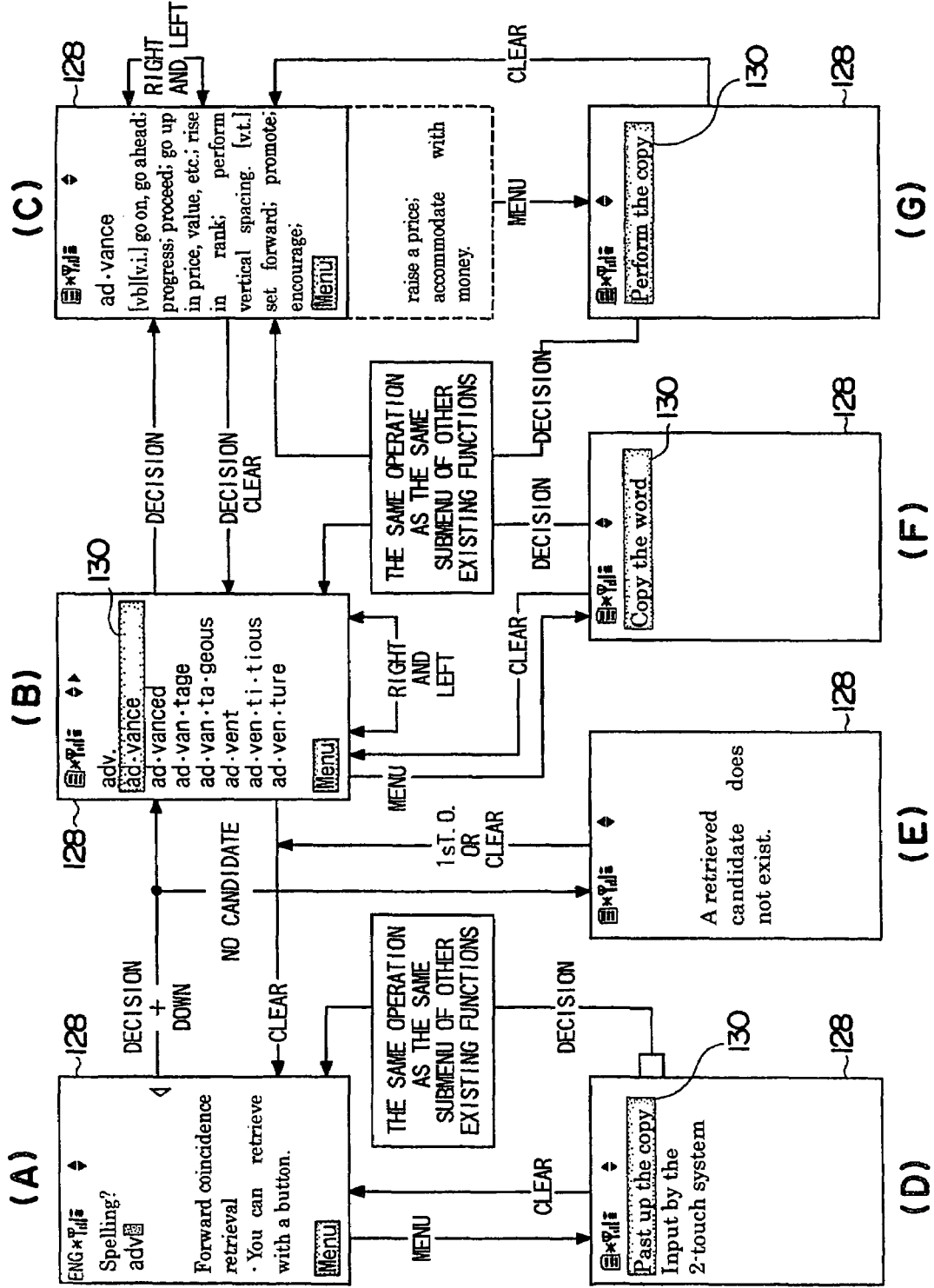
FIG. 8 is a drawing showing display of a screen and its process in the dictionary function process.

If the device proceeds to the dictionary function subroutine 106, as shown in FIG. 8(A) as an example, a screen 128 is displayed on the indication part 10. On this screen 128, the indication "English (英)" representative of the English-Japanese dictionary and the indication "spelling ? (スペル)" as indication to promote a vocabulary input operation are displayed, and also, as indication representative of an input vocabulary which is input at a step S6, for example, "adv" is displayed. Further, a cursor indication is displayed at the end of the input vocabulary, and, as information representative of the contents of processing, for example, the indication of information "Forward coincidence retrieval (前方一致検索です)" and "• You can retrieve with a button (ボタンで検索できます)" are displayed. Furthermore, as indication of other functions, "Menu" and so on are displayed. For example, in the retrieval of an English word, when a half-sized character is used, for example, it is possible to input a spelling up to thirty characters. In addition, it is presumed that an input mode is Kana input (an English letter mode) and 2-touch input (a half-sized small letter and half-sized capital letter mode), and the distinction between a capital letter and a small letter of an input character is not performed.

If the decision key 48 and the down cursor key 50 are pressed at "adv" representative of the input vocabulary, that input content is decided, the device proceeds to a step S7, and the retrieval of vocabularies existing in the dictionary DB 32 is started. In this retrieval, the device proceeds to a step S8, and, in accordance with the indication shown in FIG. 8(A), whether or not the input vocabulary corresponds to the vocabularies stored in the dictionary DB 32 is retrieved by means of the forward coincidence between the input vocabulary and the vocabularies stored in the dictionary DB 32. As a result of this retrieval, when the input vocabulary does not correspond to the vocabularies stored in the dictionary DB 32, the device proceeds to a step S9. When the correspondence does not exist, namely when a retrieved candidate does not exist, as indication representative thereof, an error indication is performed at the step S9. In this error indication, as shown in FIG. 8(E) as an example, "A retrieved candidate does not exist (検索候補がありません)" is displayed, and thereby a next operation is promoted. After this indication, if the (0) character key 84 or the clear key 60 is pressed, the device returns to the step S6, and the screen is returned to the display shown in FIG. 8(A). By this, a reentry is promoted. In this case, the operation of the clear key 60 cancels only the displayed information shown in FIG. 8(E), and the display shown in FIG. 8(A) is maintained. That is, if the spelling entered the last time is maintained when the device returns to the step S6 from the step S9, the convenience of an operation can be given.

When the input vocabulary corresponds to the vocabularies stored in the dictionary DB 32 at the step S8, the device proceeds to a step S10, and its retrieval is performed in groups of eight vocabularies. As a result of this, as shown in FIG. 8(B) as an example, a candidate list output representative of eight vocabularies is displayed. Since the input vocabulary as an example is "adv", seven kinds of words from "ad•vance" to "ad•ven•ture" are displayed as vocabularies stored in the dictionary DB 32. In this case, at the word "ad•vance", a black-and-white reversing display representative of the location of a cursor is given. This represents a cursor indication 130 showing that this word is selected.

In the display of the screen shown in FIG. 8(B), if the right cursor key 56 is operated, for example, vocabularies are displayed eight by eight as a vocabulary of a next candidate. On the other hand, if the left cursor key 54 is operated, for example, vocabularies are displayed eight by eight as a vocabularies of a previous candidate. If the number of vocabularies able to display is few, the number of vocabularies which is displayed becomes below eight vocabularies. In this case, the maximum number of vocabularies or the optional number of vocabularies able to display on the screen can be set, and it is unnecessary to be eight vocabularies.

Further, in this display screen, if the clear key 60 is pressed after proceeding to a step S11, the display of the candidate list output is cancelled, the device returns to the step S6, and thereby a reentry becomes possible. Furthermore, in the case in which the device proceeds to a step S12 without the clear key 60 being pressed, and besides, in the case in which the cursor location shown in FIG. 8(B) is being maintained, namely one vocabulary is selected by the cursor indication 130, if the menu key 46 is pressed under this state, the cursor indication 130 is to represent a copy indication, and the selected vocabulary "ad•vance" is copied (a step S13). For example, the information "Copy the word (単語をコピーする)" shown in FIG. 8(F) is displayed with black-and-white reversed characters, and, if the decision key 48 is pressed from this display, the vocabulary receiving a copy process is temporally stored in the memory 34 so that it can be called out. This processing operation is the same operation as the same submenu of other existing functions. In addition, if the clear key 60 is pressed without the decision key 48 being pressed, the copy function is cancelled, and the display screen is returned to the display shown in FIG. 8(B) from the display of FIG. 8(F).

Further, in the state that the cursor location shown in FIG. 8(B) is being maintained without the clear key 60 and the menu key 46 being pressed, if the decision key 48 is pressed from the display of the candidate list output of the step S10, the vocabulary of the cursor location is decided and the device proceeds to a step S14. By this, a result output thereof is displayed on the screen 128 of the indication part 10. The display of the result output, as shown in FIG. 8(C) as an example, shows the selected vocabulary "ad•vance" at line 1, and shows meanings of this word with an enumerative state together with the indication of the parts of speech "Verb ([動])", "Intransitive Verb ([自])" and "Transitive Verb ([他])" below line 2. In this case, a punctuation mark, a colon, a semicolon and so on are shown as indication to cut off the meanings, and further, the function indication "Menu" and so on are shown at the lowermost line. If the down cursor key 52 is pressed under the state of this display, the scrolling of the display screen is performed. By this, as shown by means of a broken line in FIG. 8(C), if some other meaning exists, that display appears.

If the clear key 60 is pressed under this state (a step S15), the display shown in FIG. 8(C) is cancelled, and the screen is returned to the display shown in FIG. 8(B) which is the display immediately before the display of FIG. 8(C). That is, the display screen is returned to the display of the candidate list output.

Further, in the display screen shown in FIG. 8(C), the previous candidate of the displayed vocabulary and its meaning are shown if the left cursor key 54 is operated, and the next candidate of the displayed vocabulary and its meaning are shown if the right cursor key 56 is operated. Such a display can change to the display of an optional candidate and its meaning within the scope of the candidate list by means of the operation of the left cursor key 54 or the right cursor key 56.

If the menu key 46 is pressed (a step S16) from the display shown in FIG. 8(C) without the clear key 60 of the step S15 being pressed, the device proceeds to a step S17, and the copy process of meaning is executed. In this case, on the screen 128 of the indication part 10, for example, a display to the effect that a copy is performed is given as shown in FIG. 8(G). For example, in this display, the cursor indication 130 appears together with the information "Perform the copy (コピーする)". If the decision key 48 is pressed under this state, the whole or a part of selected information, in this case, a selected meaning is copied. That is, the meaning receiving the copy process is temporally stored in the memory 34 so that it can be called out.

Further, if the device proceeds to a step S18 and the soft key 47 is pressed without the clear key 60 of the step S15 and the menu key 46 of the step S16 being pressed from the display screen of the result output shown in FIG. 8(C), the device proceeds to a step S19. If this soft key 47 is not pressed, the display given by the step S14 namely the display screen indicating the result output shown in FIG. 8(C) is maintained.

Then, at the step S19, whether or not a state is during a call is decided. If the state is during a call, the device returns to the step S1 and proceeds to the starting of the dictionary function again. If the state is not during a call, the device proceeds to a step S20, the process of the dictionary function is completed, and the screen is returned to the standby display 92.

By the way, after the copy process is executed, if the menu key 46 is pressed in the display screen shown in FIG. 8(A), for example, the display shown in FIG. 8(D) is given. In this case, as display showing that the copy of a word and/or its meaning stored in the memory 34 is reproduced on the screen, "Paste up the copy (コピーを貼付ける)" and "Input by the 2-touch system (2タッチ方式で入力)" are displayed. A user can select one of these processes. In an example shown in FIG. 8(D), "Paste up the copy (コピーを貼付ける)" on which the cursor indication 130 is overlapped is selected. If the decision key 48 is pressed after this selection, that process is decided. On the other hand, if the clear key 60 is pressed under the state of this display, the copy paste process is cancelled, and the display shown in FIG. 8(D) is switched to the display shown in FIG. 8(A).

As described above, if the dictionary function is called up during a call and the vocabulary input operation is performed, a user can retrieve its meaning with ease and make it display. Furthermore, a vocabulary is automatically displayed if the whole or a part of that vocabulary is entered by the vocabulary input operation, and it is possible to select a desired word from the displayed vocabularies and output its meaning. Also, since it is possible to change a word from the output screen of meaning by means of only a cursor operation and display its meaning, a complicated key operation is unnecessary.

Further, by copying the whole or a part of a displayed vocabulary and/or its meaning, it is possible to paste up and use it on a different display screen. By this, the quick and effective use of the information of a retrieved word and so on may become possible.

Figure 9:
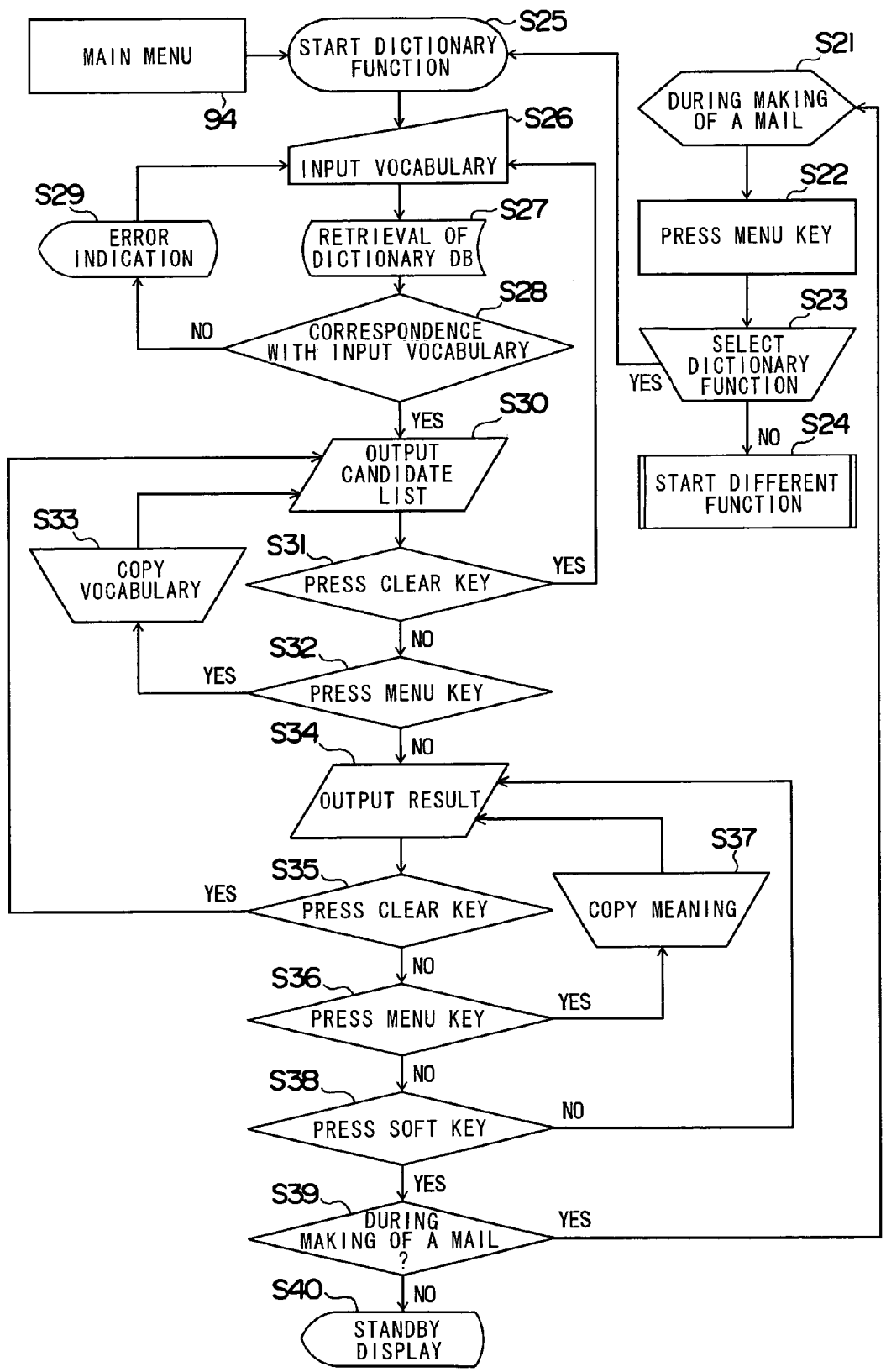
FIG. 9 is a flow diagram showing the dictionary function process and so on during the making of a mail.

Further, in the mobile terminal device and the information processing method thereof, as shown in a flow diagram of FIG. 9 as an example, it is possible to call up the dictionary function and the copy function during the making of a mail. By this, a user can retrieve a vocabulary and use a retrieved vocabulary, word or its meaning for the making of a mail. In the flow diagram shown in FIG. 9, a step S21 represents a state under execution of the mail function process 100 in the main menu process 94, and a step S39 decides whether or not a mail is being made. Since each process of steps S22-S38 and a step S40 except these steps S21 and S39 is the same as the program processing shown in FIG. 7, these explanations are left out.

As mentioned above, if the dictionary function is called up during the making of a mail and the vocabulary input operation is performed, a user can retrieve its meaning with ease and make it display. Likewise, a vocabulary is automatically displayed if the whole or a part of that vocabulary is entered by the vocabulary input operation, and it is possible to select a desired word from the displayed vocabularies and output its meaning. Also, since it is possible to change a word from the output screen of meaning by means of only a cursor operation and make its meaning display, a complicated key operation is not necessary.

Further, a user can copy the whole or a part of a displayed vocabulary and/or its meaning, paste up that copy on a mail making screen, and use the copy as a part of a mail. By this, it is possible to quickly and effectively use the information of a retrieved word and soon. Also, it is possible to contribute to the variety of expression and the prevention of an error in writing.

Figure 10:
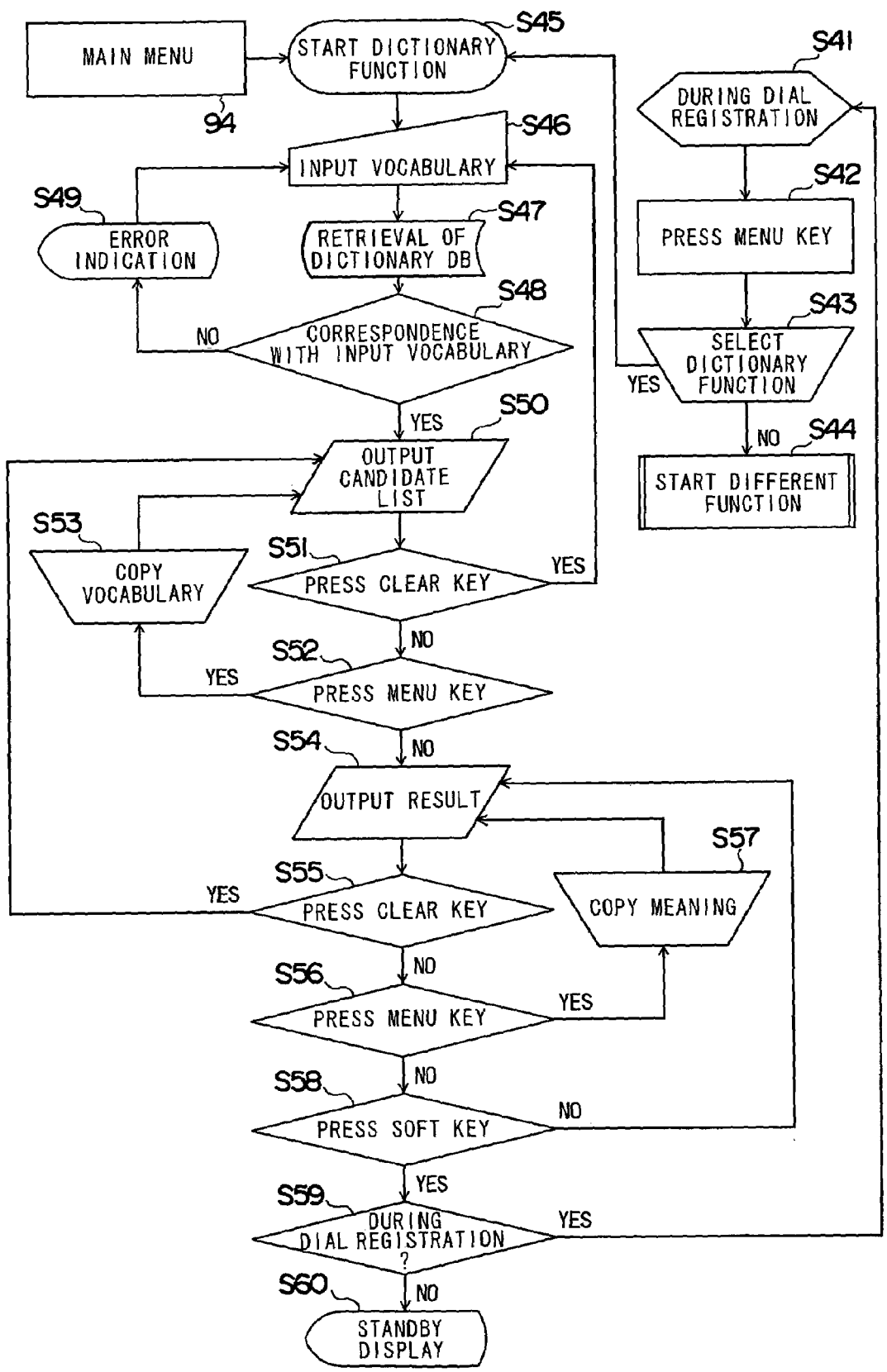
FIG. 10 is a flow diagram showing the dictionary function process and so on during a dial registration.

Further, in the mobile terminal device and the information processing method thereof, as shown in a flow diagram of FIG. 10 as an example, it is possible to call up the dictionary function and the copy function during registration of a memory dial (a phonebook). By this, a user can retrieve a vocabulary and use a retrieved vocabulary and word for a record of a person's name and/or address. In the flow diagram shown in FIG. 10, a step S41 represents a state under execution of the dial registration process 102 in the main menu process 94, and a step S59 decides whether or not a dial registration is being performed. Since each process of steps S42-S58 and a step S60 except these steps S41 and S59 is the same as the program processing shown in FIG. 7, these explanations are omitted.

As described above, if the dictionary function is called up during registration of a memory dial and the vocabulary input operation is performed, a user can retrieve its meaning with ease and make it display. By this, it is possible to use it for the input of a person's name, a name, a place name and so on. Likewise, a vocabulary is automatically displayed if the whole or a part of that vocabulary is entered by the vocabulary input operation, and it is possible to select a desired word from the displayed vocabularies and output its meaning. Also, since it is possible to change a word from the output display of meaning by only a cursor operation and display its meaning, a complicated key operation is unnecessary.

Further, a user can copy the whole or a part of a displayed vocabulary and/or meaning, paste up it on the dial registration display, and use it as a part of a person's name, a name, a place name or the like. Because of this, it is possible to quickly and effectively use the information of a retrieved word and so on. By this, the user can exactly perform the input for registration of a particular person's name, name, place name and so on, and it is possible to contribute to the prevention of an error in writing.

Figure 11:
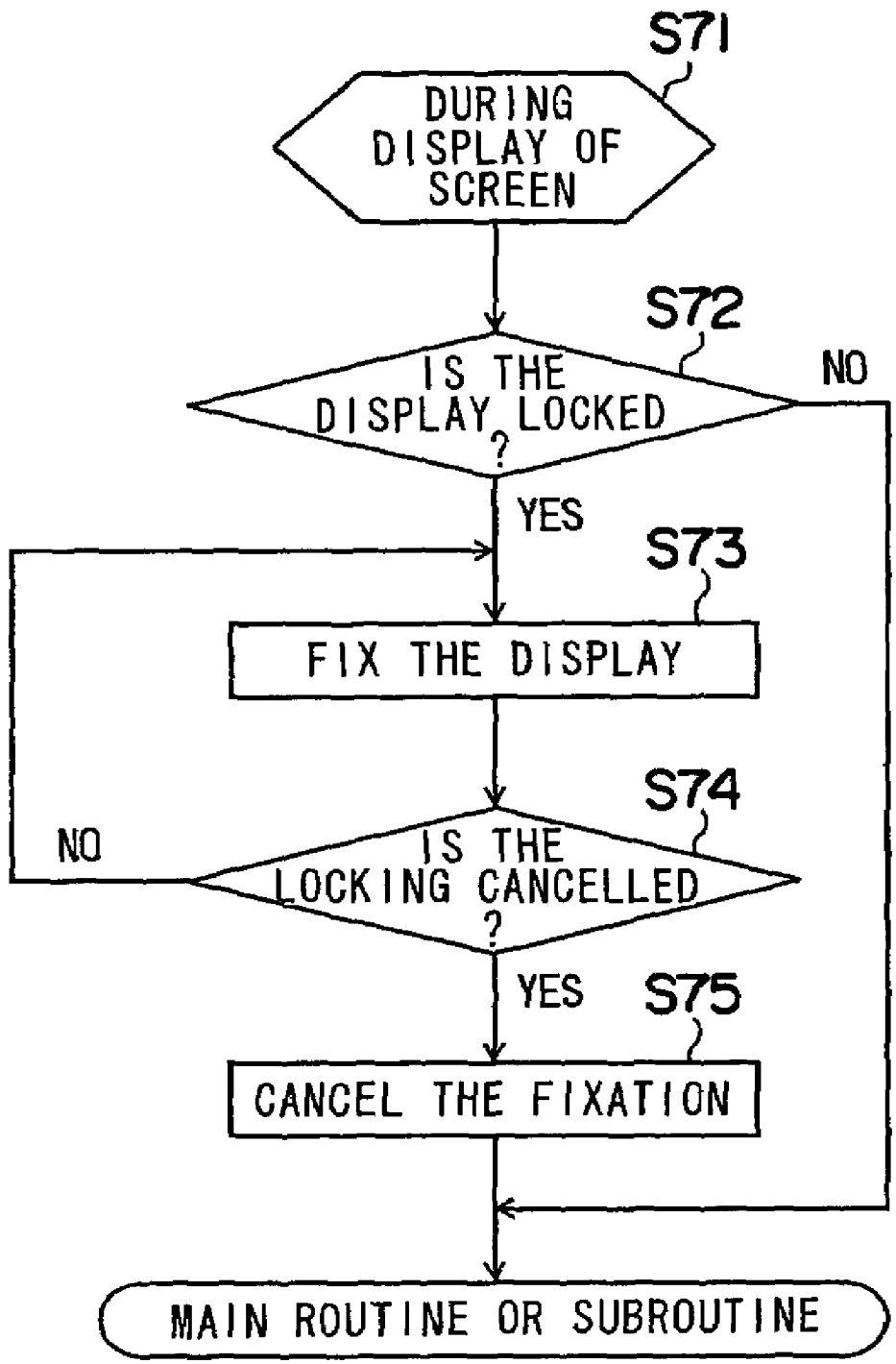
FIG. 11 is a flow diagram showing the fixation of display and cancellation of the fixation during the display of a screen.

By the way, concerning a display screen, the mobile terminal device and the information processing method thereof, for example, can provide a display control program shown in FIG. 11. In FIG. 11, a step S71 is a display screen under a state that the dictionary function is called up. If the instructions input part namely the locking switch 90 is operated to a locking side during this display (a step S72), the device proceeds to a step S73, and that display can be fixed. On the other hand, in order to cancel this fixation of the display, the locking switch 90 is operated to a canceling side (a step S74). By this, the fixed state of the display is cancelled (a step S75), and the device can proceed to a main routine or a subroutine.

As described above, by the operation of the locking switch 90, it is possible to fix a display screen with a simple operation and cancel the fixed state with ease. Because of this, if a display screen which shows a retrieved vocabulary and/or meaning is fixed, it is possible to avoid an impropriety that the display is changed by mistake during a call, for example.

In the embodiment mentioned above, as an example, in addition to the communication process, the mail function, the dial registration function and the dictionary function are shown as other function processes. Function processes, such as a game function, may also be included. Further, it is possible to call up the dictionary function as a different function process during a function process, such as a telephone call, making of a mail, registration of a memory dial, a connection with the internet and processing of a game. And, likewise, it is possible to perform the retrieval of a vocabulary and its meaning and the copy of a retrieved word and/or meaning.

In addition, although in the above-mentioned embodiment explanation of each process in each function process and so on is given, each control process according to the present invention also includes processing which makes that execution possible.

Although the best mode for carrying out the invention, the object, the configuration and the operation and effect have been described in detail above, the invention is not limited to such embodiment for carrying out the invention, and it is a matter of course that the invention can be variously changed or modified by a person skilled in the art on the basis of a gist and split of the invention as disclosed in claims and the detailed description of the invention, and such a change or modification, and various conjectured configurations, modified examples and so forth are included in the scope of the invention, and the description of the specification and drawings are not restrictively understood.

The entire disclosure of Japanese Patent Application No.2002-273186 including specification, claims, drawings and summary are incorporated herein by reference in its entirety.

What is claimed is:

1. A mobile terminal device comprising:
a communication processing part that executes a communication process of voice communication or non-voice communication;
a function processing part that executes a function process except said communication process;
a selection input part that selects the function process to be executed in said function processing part;
an indication part that allows selections related to said function process being activated when the function process is selected by said selection input part; and
a control part that
receives a selective input from said selection input part during execution of said communication process or another function process,
makes said function processing part to execute said function process selected by said selective input simultaneously with said communication process or said another function process under execution, or makes that simultaneous execution possible,
when a dictionary function is activated by the indication part selecting a word or part of a word included in input data in a first language from said function process under execution, displays a list of words of a first language, related to the selected word or part of a word included in the input data, and
upon the indication unit selecting one word from the displayed list of words of the first language, displays a translation in a second language of the selected word, and information about meaning of the selected word in the second language.

2. The mobile terminal device of claim 1,
wherein said dictionary function process is able to select a word from a dictionary, and
if a spelling of the word is entered, a group of words having said spelling and detailed information on meanings of each word from said group of words is sequentially indicated on said indication part when said dictionary function process is executed in said function processing part.

3. The mobile terminal device of claim 1, wherein said control part has a processing function that, based on a copy processing input, performs a copy indication indicating a copy process at the whole or a part of information under indication in an indication part, and makes this copy-indicated information maintain in a storage part.

4. The mobile terminal device of claim 1 further including an additional indication part that indicates information given by said function process under execution and management in said control part.

5. The mobile terminal device of claim 1 further including a storage part that memorizes information given by said function process under execution and management in said control part or information to be used in said function process.

6. The mobile terminal device of claim 1, further comprising:
an input operation part installed in a housing having said indication part and used for instructions to fix content indicated in said indication part or for cancellation of that fixation,
wherein said control part fixes the content indicated in said indication part or cancels that fixation in response to input representing the instructions to fix or the cancellation of that fixation from said input operation part.

7. A method for information processing of a mobile terminal device, comprising:
   executing a communication process of voice communication or non-voice communication;
   selecting a function process other than said communication process to execute;
   executing, when said communication process or another function process is being executed, the selected function process simultaneously with said communication process or said another function process under execution, or making a simultaneous execution possible;
   sequentially indicating a word or part of a word of a first language included in input data, and activating a dictionary function from said function process under execution to display a list of words of a first language, related to the indicated word or part of a word in the input data; and
   stepwise selecting a word from the displayed list of words of the first language and displaying translation of the selected word and information about meaning of the selected word in a second language via a dialogue with a user while said dictionary function is running.

8. The method of claim 7, wherein in the dictionary function process, if a spelling of a word is entered, a group of words having said spelling and detailed information on meanings of each word from said group of words are sequentially indicated on said indication part.

9. The method of claim 8, wherein said dictionary function process includes a copy process of displayed information of an output screen.

10. The method of claim 7, wherein the function process except said communication process is a mail function process.

11. The method of claim 7, wherein the function process except said communication process is a dial registration process.

12. The method of claim 7, further comprising:
   receiving instructions to fix content indicated in said indication part or to cancel that fixation based on an entry from an input operation part installed in a housing having said indication part; and
   fixing the content indicated in said indication part or canceling that fixation by means of the instructions to fix or instructions of the cancellation thereof.

13. A computer readable medium storing a computer program for information processing of a mobile terminal device, the computer program comprising:
   a function that executes a communication process of voice communication or non-voice communication;
   a function that selects a function process to manage;
   a function that, when said communication process or said another function process is being executed, executes the selected function process simultaneously with said communication process or said another function process under execution, or makes a simultaneous execution possible;
   a function that sequentially indicates a word or part of a word of a first language included in input data, and activates a dictionary function to display a list of words of a first language, related to the indicated word or part of a word in the input data; and
   a function that stepwise selects a word from the displayed list of words of the first language, and displays a translation of the selected word and information about meaning of the selected word in a second language via a dialogue with a user while said dictionary function is running.

14. The computer readable medium of claim 13, wherein the function process except said communication function is the dictionary function process, and
   if a word is selected from a dictionary, and a spelling of the word is entered, a group of words having the spelling and a detailed information on meanings of each word from said group of words are sequentially indicated.

15. The computer readable medium of claim 14, wherein said dictionary function process includes a step that executes a copy process of displayed information of an output screen.

16. The computer readable medium of claim 13, wherein the function process except said communication process is a mail function process.

17. The computer readable medium of claim 13, wherein the function process except said communication process is a dial registration process.

18. The computer readable medium of claim 13, the program further comprising:
   a procedure that indicates content in an indication part;
   a procedure that receives instructions to fix content indicated in said indication part or cancel of that fixation based on an entry from an input operation part installed in a housing having said indication part; and
   a procedure that fixes the content indicated in said indication part or cancels that fixation by means of the instructions to fix or instructions of the cancellation thereof.

19. A process, comprising:
   allowing a user to perform communication with a mobile device;
   allowing the user to select one of several non-communication functions of the mobile device to execute during the communication;
   allowing the user to enter data required for the execution of the one user-selected function during the communication;
   selecting a word or part of a word in a first language from the entered data thereby activating a dictionary function that displays a list of words in the first language related to the selected word or part of a word; and
   displaying a translation in a second language of a word from the displayed list, and information about meaning of the word in the second language, when the word is indicated.

20. An information processing method for a mobile terminal device performing a communication process, the method comprising:
   performing simultaneously with the communication process a function process selected from a plurality of function processes other than said communication process;
   inputting data necessary to said function process and displaying a content of processing by said function process, wherein the plurality of function processes include a dictionary function process;
   activating the dictionary function after selecting a word or portion of a word from the input data;
   displaying a list of words in a first language related to the selected word or portion of a word from the input data;
   selecting a target word from the list of words; and
   displaying a translation of the target word in the second language and information about meaning of the target word in the second language.

* * * * *

UNITED STATES PATENT AND TRADEMARK OFFICE
CERTIFICATE OF CORRECTION

| | |
|---|---|
| PATENT NO. | : 7,349,716 B2 |
| APPLICATION NO. | : 10/651034 |
| DATED | : March 25, 2008 |
| INVENTOR(S) | : Susumu Aoyama et al. |

It is certified that error appears in the above-identified patent and that said Letters Patent is hereby corrected as shown below:

Column 17, Line 15, after "language" delete ",".

Signed and Sealed this

Nineteenth Day of August, 2008

JON W. DUDAS
*Director of the United States Patent and Trademark Office*